(12) United States Patent
Liu et al.

(10) Patent No.: US 11,701,742 B2
(45) Date of Patent: Jul. 18, 2023

(54) REPAIR METHOD FOR SELF-DETECTING AND SELF-HEALING OF CORROSION DEFECTS IN METALS

(71) Applicant: UNIVERSITY OF SCIENCE AND TECHNOLOGY BEIJING, Beijing (CN)

(72) Inventors: Zhiyong Liu, Beijing (CN); Baozhuang Sun, Beijing (CN); Xiaogang Li, Beijing (CN); Yedong He, Beijing (CN)

(73) Assignee: University of Science and Technology Beijing

( * ) Notice: Subject to any disclaimer, the term of this patent is extended or adjusted under 35 U.S.C. 154(b) by 183 days.

(21) Appl. No.: 17/268,638

(22) PCT Filed: Sep. 29, 2020

(86) PCT No.: PCT/CN2020/118771
§ 371 (c)(1),
(2) Date: Feb. 16, 2021

(87) PCT Pub. No.: WO2021/196544
PCT Pub. Date: Oct. 7, 2021

(65) Prior Publication Data
US 2022/0118563 A1 Apr. 21, 2022

(30) Foreign Application Priority Data
Mar. 31, 2020 (CN) .......................... 202010243009.0

(51) Int. Cl.
*B23P 6/00* (2006.01)
*B23K 15/00* (2006.01)
*G01N 17/00* (2006.01)

(52) U.S. Cl.
CPC .......... *B23P 6/007* (2013.01); *B23K 15/0086* (2013.01); *G01N 17/006* (2013.01)

(58) Field of Classification Search
CPC ........ B23P 6/00; B23P 6/007; B23K 15/0086; G01N 17/006
See application file for complete search history.

(56) References Cited

U.S. PATENT DOCUMENTS

2013/0032578 A1* 2/2013 Trapp .................. B23K 11/004
29/402.13

* cited by examiner

*Primary Examiner* — Moshe Wilensky
(74) *Attorney, Agent, or Firm* — Myers Bigel, P.A.

(57) ABSTRACT

A repair method for self-detecting and self-healing of corrosion defects in metals can achieve self-detecting and self-healing repair of an initial corrosion defect and be used to repair a micron-level corrosion defect. Furthermore, the self-detecting and self-healing repair method can be used to effectively repair an initial corrosion defect in a large-sized high-precision structural component, thus effectively improving the service safety of the high-precision metal structural component and prolonging the service life of the same.

10 Claims, 7 Drawing Sheets

REPAIR METHOD FOR SELF-DETECTING AND SELF-HEALING OF CORROSION DEFECTS IN METALS

CROSS-REFERENCE TO RELATED APPLICATION

The present application is a 35 U.S.C. § 371 national stage application of PCT International Application No. PCT/CN2020/118771, filed on Sep. 29, 2020, which claims the benefit of Chinese patent application No. 202010243009.0, filed on Mar. 31, 2020, the contents of each of which are incorporated by reference herein in their entireties.

TECHNICAL FIELD

The present disclosure relates to the technical field of repair of corrosion detects in materials, in particular to a repair method for self-detecting and self-healing of corrosion defects in metals.

BACKGROUND

At present, steel structural components are inevitably corroded during service, and their service life and service safety are seriously affected. Therefore, it is of great significance to repair defects in the steel structural components, especially in some large-sized high-precision structural components, such as propellers in ships, large-sized bearings, nuclear components, and large-sized chemical containers, in long-term service. If initial corrosion defects are not repaired timely, serious corrosion accidents may be caused. Consequentially, huge losses will be caused to actual production and life.

In the prior art, macroscopic corrosion defects of metal structural components are repaired in most cases. Even more, it is necessary to investigate whether or not required performance of repaired positions can be achieved. In addition, the initial corrosion defects need to be repaired with high detection means in most cases. This indirectly increases maintenance cycles and maintenance costs.

Therefore, it is necessary to put forward a repair method for self-detecting and self-healing of corrosion defects in metals to overcome the shortcomings of the prior art and solve and alleviate one or more problems mentioned above.

SUMMARY

In view of this, the present disclosure provides a repair method for self-detecting and self-healing of corrosion defects in metals to rapidly achieve self-detecting and self-healing repair of an initial corrosion defect in a metal structural component. A repaired area has performance basically the same as that of the original component, so that maintenance costs and maintenance cycles are directly reduced, and remanufacturing of metals is achieved.

In an aspect, a repair method for self-detecting and self-healing of corrosion defects in metals is provided. The method makes advantages of a Joule heating effect generated at a partial position of a corrosion defect in a micro-arc discharge process to heat a defective position to make its temperature rise rapidly for melting. Then, a melted metal flows into the defect under an effect of a thermal stress, so that self-detecting and self-healing repair for an initial corrosion defect is achieved.

Further, based on the above aspect and any possible implementation, the repair method particularly may include the following steps:

step S1: cleaning a structural component to be repaired, especially a surface thereof, according to a service condition of the structural component to be repaired;

step S2: determining a size and array of a repair probe according to a state of a defect in the structural component to be repaired;

step S3: preparing a suitable working medium according to a heat source and an operation condition;

step S4: repairing the surface of the structural component to be repaired by means of the heating effect generated at a defective position of the structural component to be repaired in the micro-arc discharge process till the surface is smooth without arcing any longer; and step S5: treating the surface of the structural component repaired, and detecting a repaired position to determine a repair effect.

Further, based on the above aspect and any possible implementation, the step of determining a size and array of a repair probe in step S2 may particularly include: when the defective position is detected for repair, selecting an array probe having an appropriate size according to a detection range; where, the size of the probe may be selected according to a power supply matched with the probe to achieve a partial high-energy input, so that an energy density required by partial melting of the defective position may be achieved.

Further, based on the above aspect and any possible implementation, an electron flow or a plasma flow generated in a strong electric field may serve as a heat source for a partial heating effect in the micro-arc discharge process in step S4.

Further, based on the above aspect and any possible implementation, a microscopic process for the repair in step S4 may be as follows: currents may be accumulated at the tip of the defective position due to a skin effect when flowing through the surface of the structural component to be repaired; and in this way, the partial position may have a temperature rising with a voltage rise and thus may be melted, and a liquid metal may flow into the defect under the effect of surface tension, so that the defect may be repaired.

Further, based on the above aspect and any possible implementation, the repair method may be used to repair the initial corrosion defect rather than to repair a shallow dish-shaped corrosion defect, where the initial corrosion defect may include: pitting corrosion, intergranular corrosion, and a microcrack.

Further, based on the above aspect and any possible implementation, the repair method may be suitable for partially repairing a corrosion defect with a depth less than 300 microns, where an interface between a repaired area and a substrate may be formed by means of metallurgical bonding; and after the repair is finished, the repaired area may have a microstructure and corrosion performance almost the same as those of the original component.

Further, based on the above aspect and any possible implementation, the repair method may be suitable for metals and conductive alloys, where the metals may include, but may be not limited to, steel, aluminum, and copper; and the conductive alloys may include, but may be not limited to, steel alloys, aluminum alloys, and copper alloys.

Compared with the prior art, the present disclosure has the following technical effects: the self-detecting and self-healing repair of the initial corrosion defect in surfaces of the metals is achieved by means of a high current density of the tip of the defect in the discharge process; the currents are accumulated at the tip of the defective position due to the skin effect when flowing through the surface of a defective sample; in this way, the partial position has the temperature rising with the voltage rise and thus is melted, and the liquid metal flows into the defect under the effect of the surface tension, so that the defect is repaired; and because the currents are uniformly distributed on the surface of a complete sample rather than accumulated at a point, no change to the currents will be generated. Thus, the present disclosure can achieve the self-detecting and self-healing repair of the initial corrosion defect; and furthermore, the interface between the repaired area and a substrate is formed by means of the metallurgical bonding, so that the repaired area has performance not significantly changed after the repair is completed.

The present disclosure can be used to effectively repair initial corrosion defects in some large-sized high-precision structural components in long-term service, and provides a feasible repair technology for remanufacturing of metal structural components and corrosion prevention of the metals.

Of course, any product of the present disclosure is unnecessarily to achieve all the above technical effects.

BRIEF DESCRIPTION OF DRAWINGS

For the sake of a clearer explanation of the technical solutions of the embodiments of the present disclosure, the accompanying drawings required by the embodiments will be described briefly below. Clearly, the following accompanying drawings merely illustrate some embodiments of the present disclosure, and other accompanying drawings can also be obtained by those ordinarily skilled in the art based on the following ones without creative efforts.

DETAILED DESCRIPTION

For the sake of a better understanding of the technical solutions of the present disclosure, the embodiments of the present disclosure are described in detail below with reference to the accompanying drawings.

The embodiments in the following descriptions are only illustrative ones, and are not all possible ones of the present disclosure. All other embodiments obtained by those ordinarily skilled in the art based on the embodiments of the present disclosure without creative efforts should also fall within the protection scope of the present disclosure.

Terms in embodiments of the present disclosure are merely used to describe the specific embodiments, and are not intended to limit the present disclosure. Unless otherwise specified in the context, words, such as "a", "the", and "this", in a singular form in the embodiments and appended claims of the present disclosure include plural forms.

Figure 1:
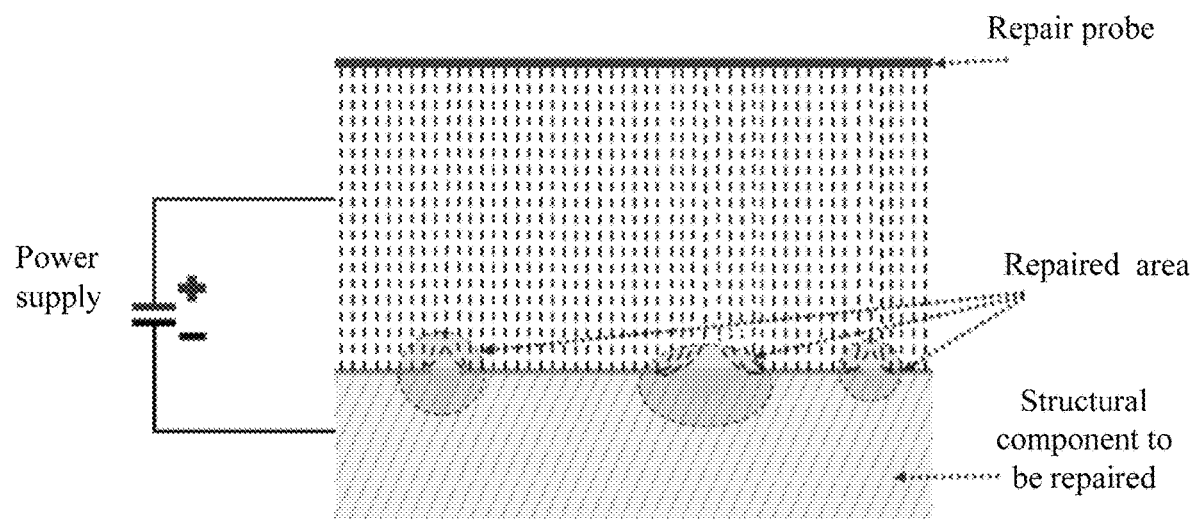
FIG. 1 is a schematic diagram of a repair method for self-detecting and self-healing of corrosion defects in metals in an embodiment of the present disclosure.
Figure 2:
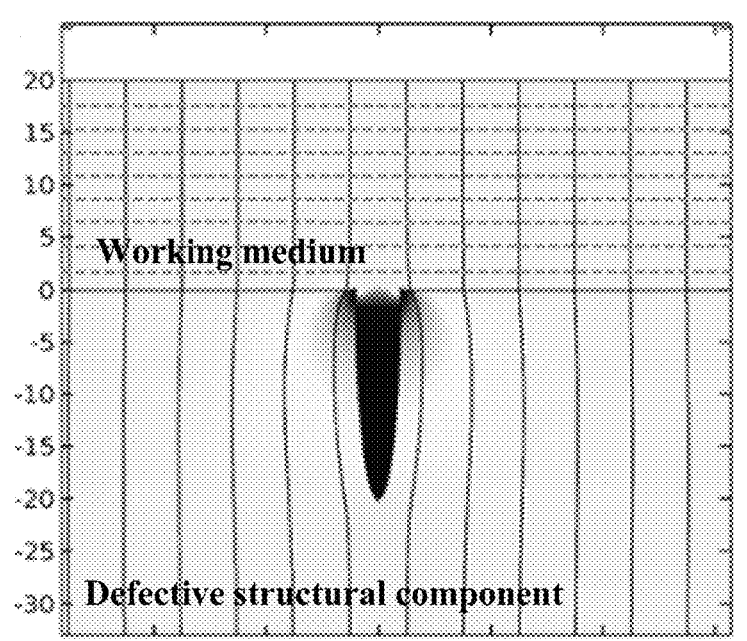
FIG. 2 is a distribution diagram of currents on a cross section of a 5 μm wide and 20 μm deep pitting defect in a finite element modeling process in an embodiment of the present disclosure.
Figure 3:
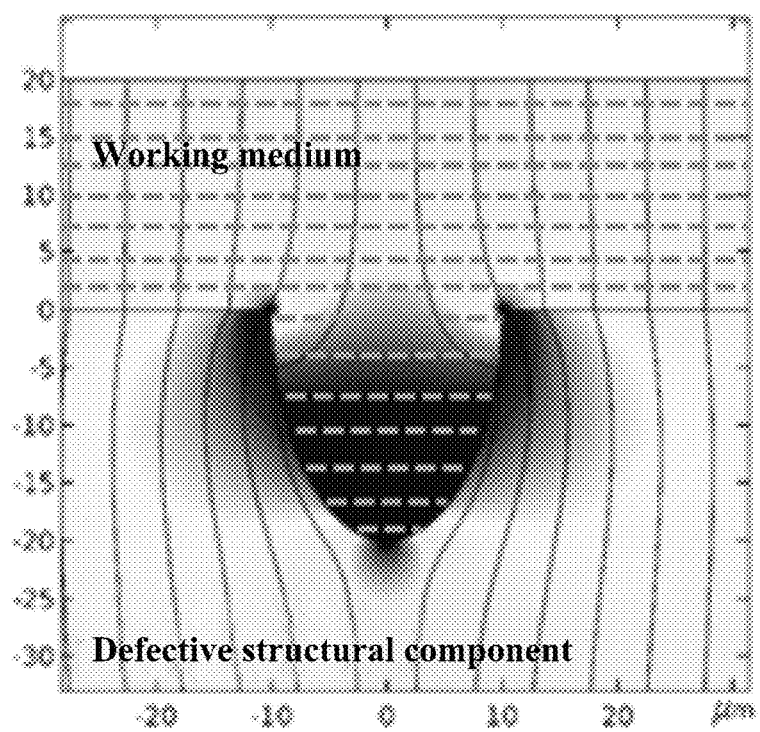
FIG. 3 is a distribution diagram of currents on a cross section of a 20 μm wide and 20 μm deep pitting defect in the finite element modeling process in an embodiment of the present disclosure.
Figure 4:
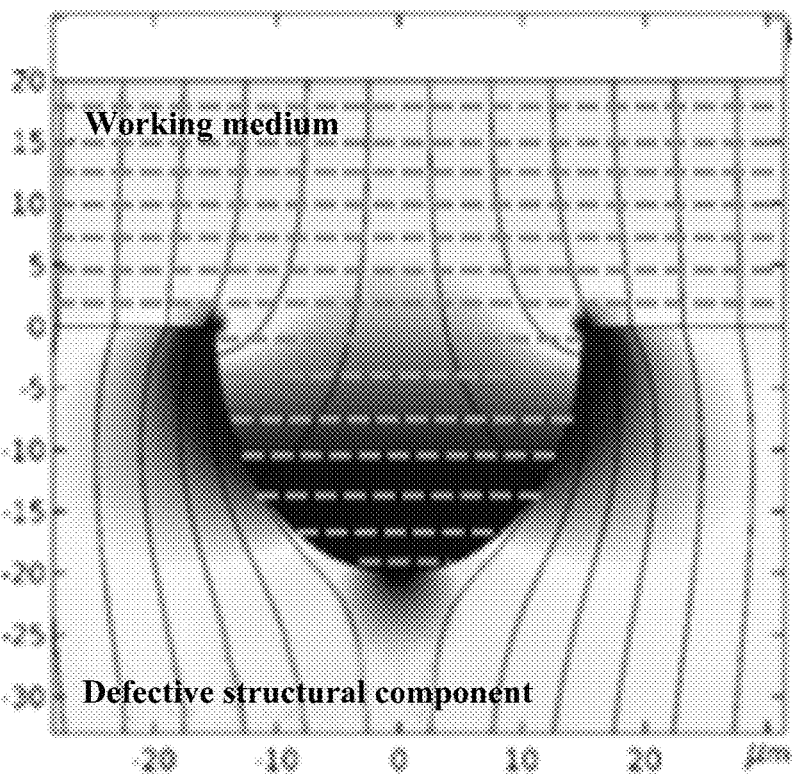
FIG. 4 is a distribution diagram of currents on a cross section of a 30 μm wide and 20 μm deep pitting defect in the finite element modeling process in an embodiment of the present disclosure.
Figure 5:
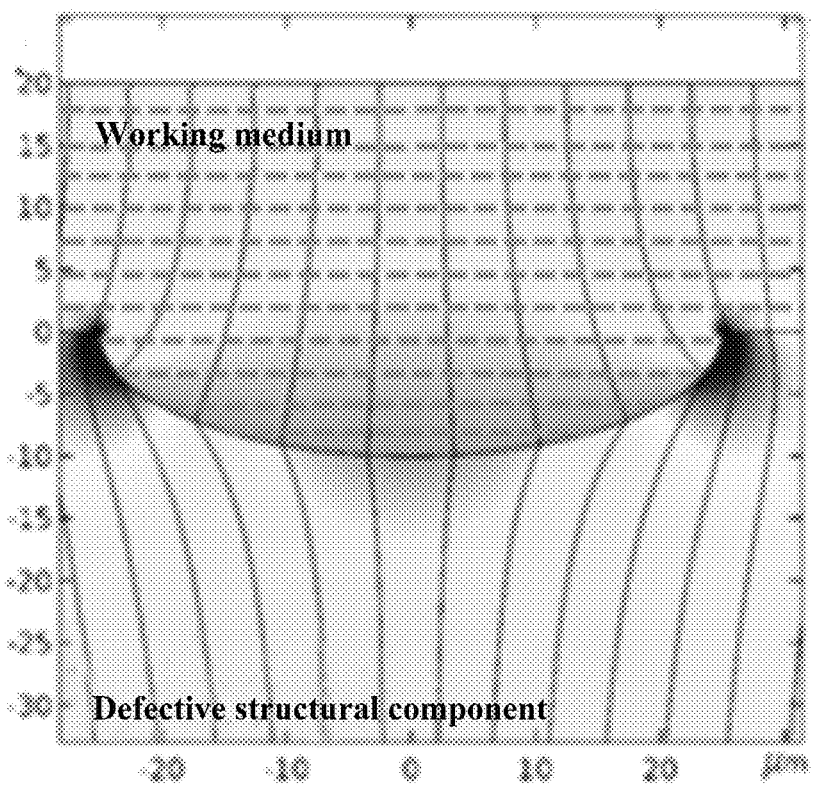
FIG. 5 is a distribution diagram of currents on a cross section of a 50 μm wide and 10 μm deep pitting defect in the finite element modeling process in an embodiment of the present disclosure.
Figure 6:
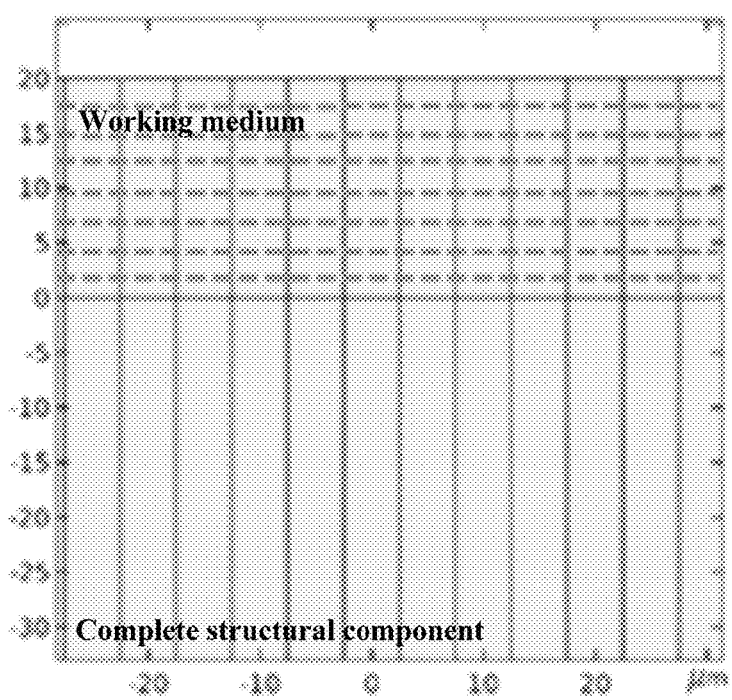
FIG. 6 is a distribution diagram of currents on a complete surface in an embodiment of the present disclosure.

The present disclosure provides a repair method for self-detecting and self-healing of corrosion defects in metals, the principle of which is shown in FIG. 1. The self-detecting and self-healing repair method particularly includes the following steps:

Step 1: design a repair scheme according to a service condition of a defective structural component, where the structural component to be repaired, especially the surface thereof, is cleaned;

Step 2: select repair probes having appropriate sizes and arrays, where an appropriate number of repair probes having the appropriate sizes are selected according to a state of a defect in the structural component to be repaired in an actual operation condition for healing;

Step 3: determine a repair process, where a suitable working medium, such as a special solution with appropriate conductivity or a liquid (such as seawater) in which the structural component to be repaired is located, is prepared according to different heat sources and operation conditions;

Step 4: discharge for the healing, where the surface of the structural component is repaired by means of a partial heat effect generated in a discharge process till being smooth without arcing any longer; and Step 5: perform quality inspection after the surface is treated and repaired, where the surface of the structural component repaired is treated to make its quality meet a technical requirement, and a repaired position is detected to determine a repair effect.

The repair method of the present disclosure is suitable for various metals and conductive alloys which include, but are not limited to, steel alloys, aluminum alloys, and copper alloys.

Embodiment 1

Figure 7:
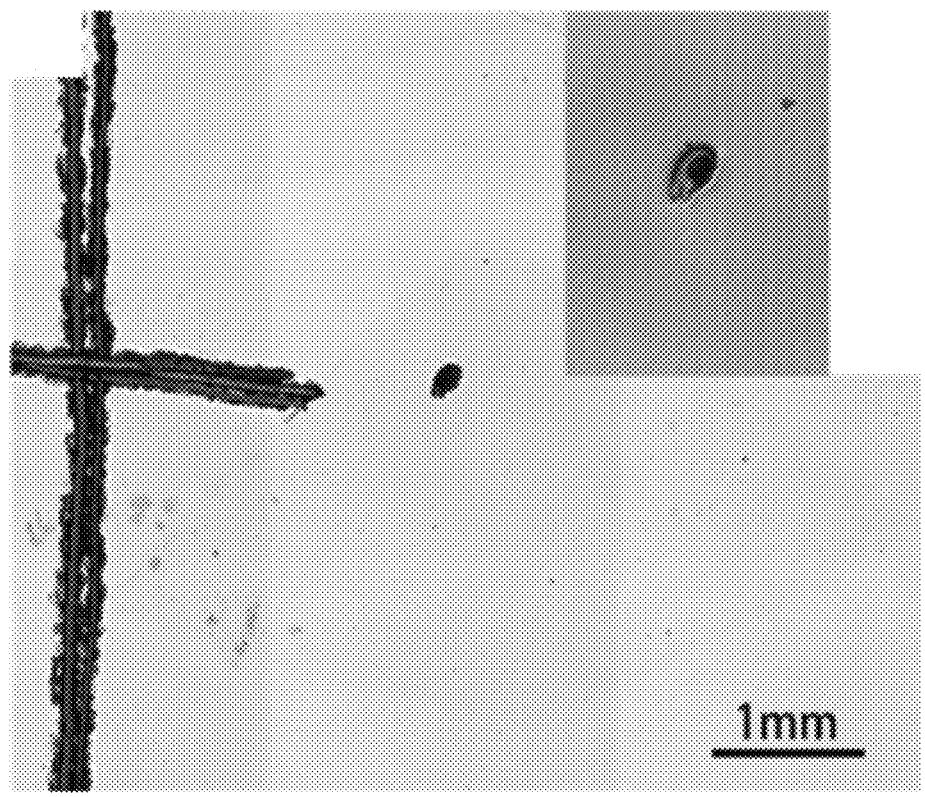
FIG. 7 is a morphology image of a pitting defect which is not healed in an embodiment of the present disclosure.
Figure 8:
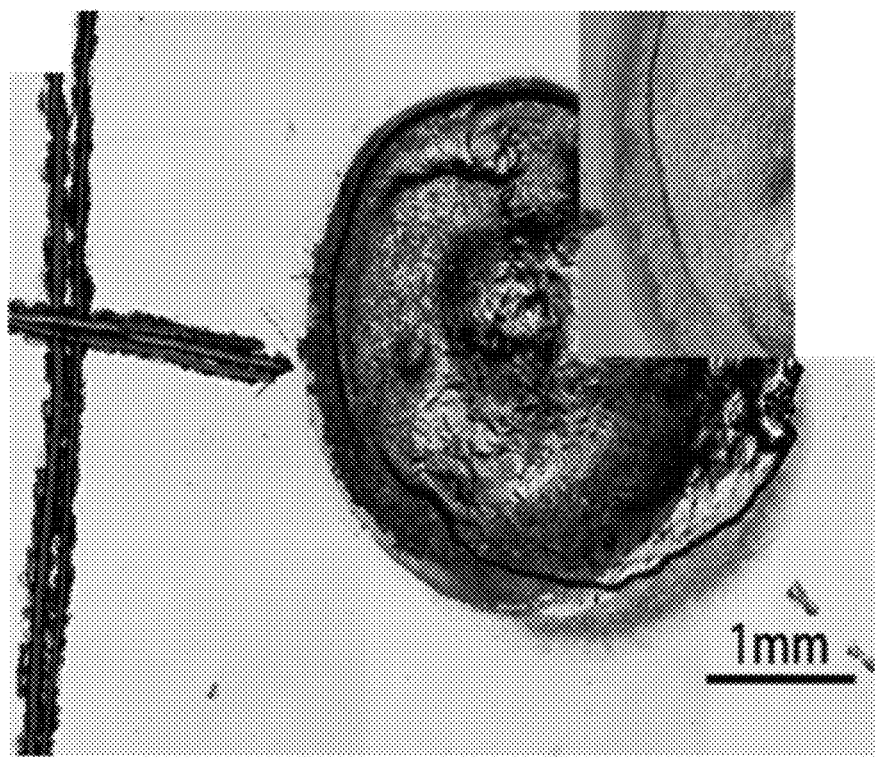
FIG. 8 is a morphology image of the pitting defect healed in an embodiment of the present disclosure.
Figure 9:
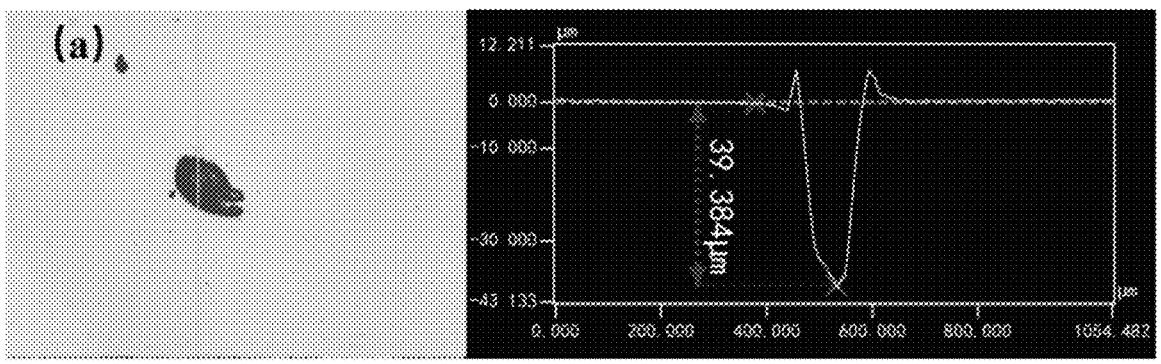
FIG. 9 is a graph showing a profile measurement of the pitting defect which is not healed in an embodiment of the present disclosure.
Figure 10:
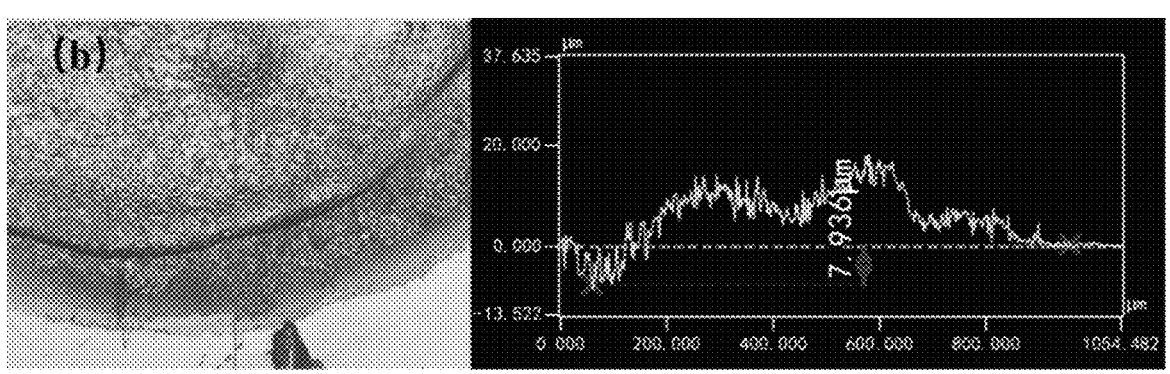
FIG. 10 is a graph showing a profile measurement of the pitting defect healed in an embodiment of the present disclosure.

A repair method for self-detecting and self-healing of corrosion defects in metals is used to repair an initial pitting defect on the surface of a component made from 316L stainless steel. The self-detecting and self-healing repair method in this embodiment includes the following steps: (1) clean the surface of the defective component, where the component to be repaired is placed into alcohol and acetone for ultrasonic cleaning to remove surface impurities, so that a repair scheme is designed; (2) select a suitable probe for a repair experiment; (3) determine a working medium for repair, where a NaOH solution of 10M is adopted as a repair solution in this embodiment; (4) detect and observe a repaired position of the surface. FIG. 2-6 shows simulation results in a finite element modeling process of cross sections of pitting defects, having different depths and widths, in the component made from the 316L stainless steel in this embodiment. It can be seen from FIG. 2-5 that when the surface of the component is defective, currents will be accumulated at the tip of the defect in the surface of the component. It can be seen from FIG. 6 that this effect cannot be generated on a complete surface. Such result further proves that this repair method can achieve self-detecting repair of the defect. FIG. 7 and FIG. 8 shows morphology images of the initial pitting defect in the component made from the 316L stainless steel before and after the repair is performed. FIG. 9 and FIG. 10 show a measurement result of the depth of the initial pitting defect healed. It can be seen from FIG. 9 and FIG. 10 that the pitting defect is rapidly healed by means of this self-healing method. Pits with different initial depths are further healed to be repaired, and a healing rate is denoted by K:

$$K = \frac{d_1 - d_2}{d_1} \times 100\%;$$

Figure 11:
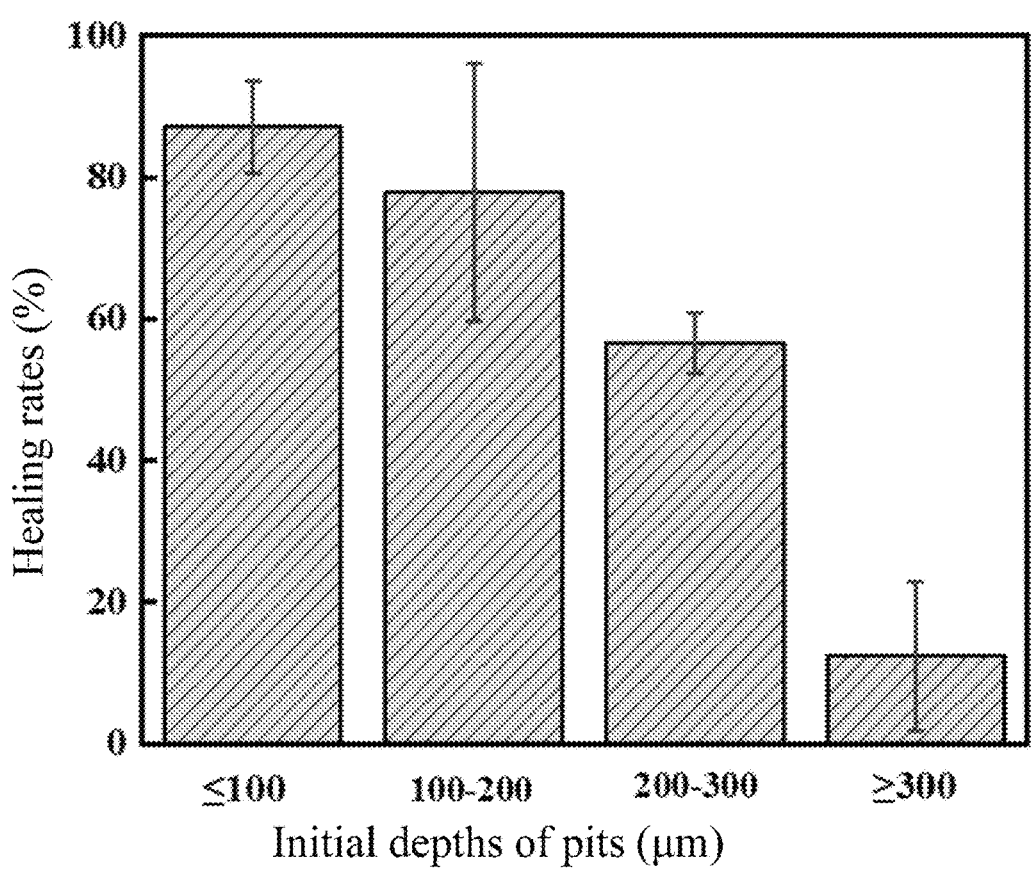
FIG. 11 is a statistical graph showing a healing capability of the pitting defect in an embodiment of the present disclosure.
Figure 12:
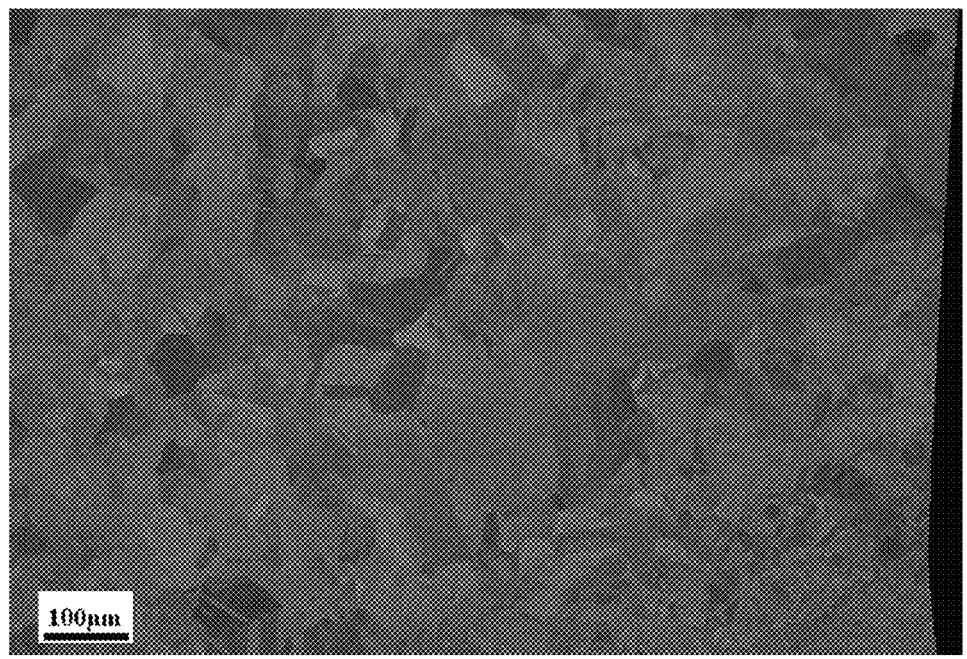
FIG. 12 is an observation image from a backscattered electron detector (BSED) of a cross section of a healing area of the pitting defect in an embodiment of the present disclosure.
Figure 13:
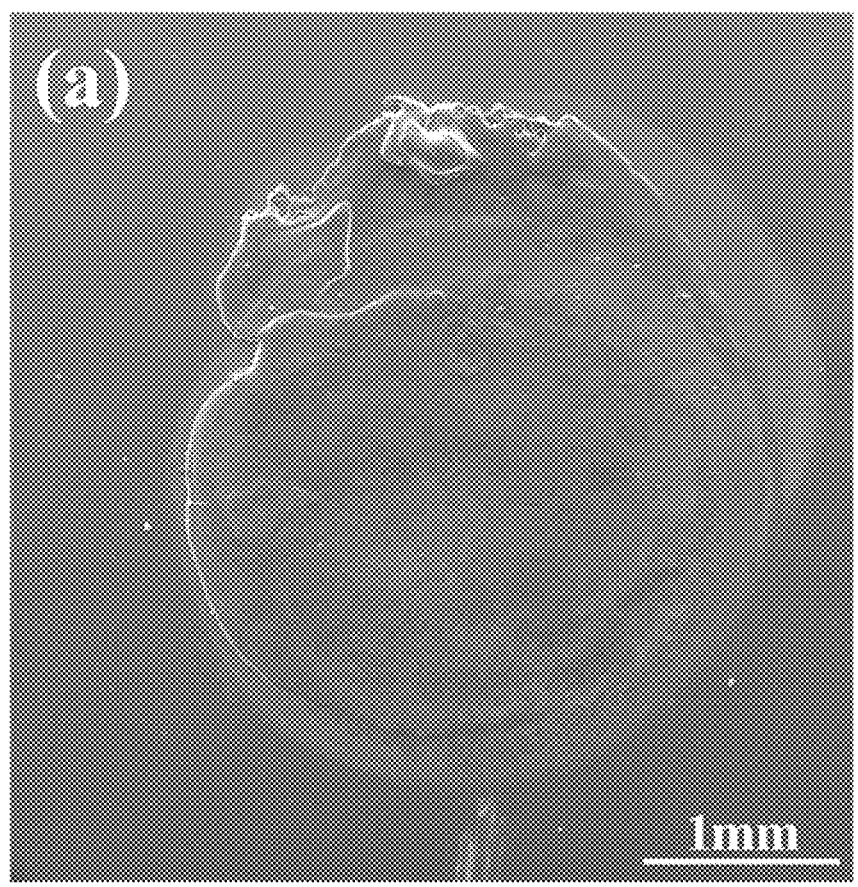
FIG. 13 is a morphology image of the surface of the healing area and an original substrate which is not immersed in a 7% NaCl solution in an embodiment of the present disclosure.
Figure 14:
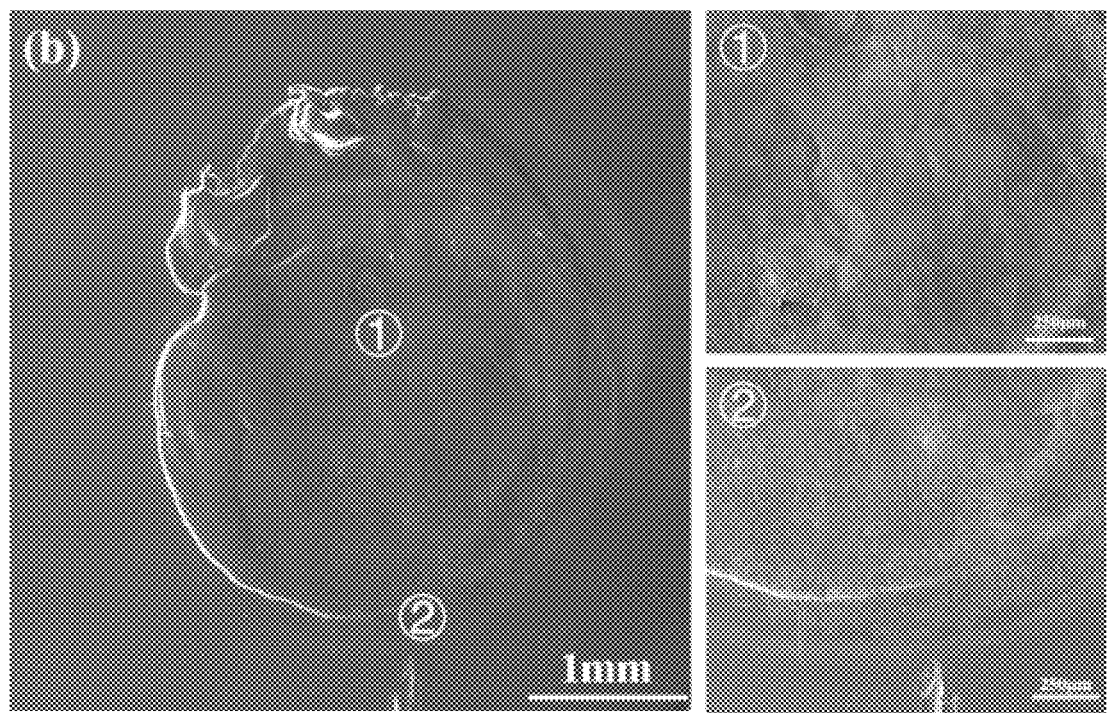
FIG. 14 shows a morphology image of the surface of the healing area and the original substrate which has been immersed in the 7% NaCl solution for 30 days in an embodiment of the present disclosure.

Where, $d_1$ and $d_2$ respectively represent an initial depth of the pits and a depth of the pits healed. FIG. 11 shows a statistical result of the initial depths and healing rate K of the pits based on parameters in this embodiment. It can be seen from FIG. 11 that an initial corrosion defect can be well healed by means of this self-healing method. A healing effect, corrosion resistance, and the like of a healing area are further evaluated. FIG. 12 shows an observation result of a cross section of the healing area from BSED. It can be seen from FIG. 12 that the healing area is entirely intact without a seam or other defects. FIG. 13 shows a morphology image of the surface of the healing area, which is not immersed in a 7% NaCl solution, of the corrosion defect. FIG. 14 shows a morphology image of the surface of the healing area, which has been immersed in the 7% NaCl solution for 30 days, of the corrosion defect. ① and ② in FIG. 14 are enlarged views of two positions in FIG. (b). It is obvious that the healing area, which has been immersed for 30 days, of the corrosion defect generates no pitting defects or other corrosion defects and is almost the same as the healing area, which is not immersed, of the corrosion defect. This indicates that a material, repaired by means of the self-healing method, has a surface with good corrosion resistance and is almost the same as the original component.

The repair method of the present disclosure can achieve the self-detecting and self-healing repair on the initial corrosion defect and be used to repair a micron-level corrosion defect. Furthermore, the repair method can be used to effectively repair an initial corrosion defect in a large-sized high-precision structural component, thus effectively improving the service safety of the high-precision metal structural component and prolonging the service life of the same.

The above embodiments are used to expound the repair method for self-detecting and self-healing of corrosion defects in metals of the present application. The description of these embodiments is merely used to assist in understanding the method of the present application and its core conception. In addition, those ordinarily skilled in the art can make various modifications in terms of specific embodiments and scope of application based on the conception of the present application. In summary, the content of the specification should not be construed as a limitation to the present application.

Some words are used to name specific components in the specification and claims. Those skilled in the art should understand that hardware manufacturers may name the same components with different words. The components in the specification and claims are distinguished by different functions instead of different names. The word "comprise" or "include" mentioned throughout the specification and claims is an open term and should be interpreted as "comprising/including but not limited to"; and the word "approximate" refers to that within an acceptable error range, and those skilled in the art can solve the technical problem within a certain error range and basically achieve the technical effect. The subsequent description of the specification is a preferred embodiment of the present application. However, the description is for the purpose of explaining a general principle of the present application, and is not intended to limit the scope of the present application. The protection scope of the present application should be defined by the appended claims.

It should also be noted that the term "comprise", "include", or any other variant thereof is intended to encompass a non-exclusive inclusion, such that a product or system that includes a series of elements includes not only those elements, but also other elements not explicitly listed, or elements that are inherent to such a product or system. Without more restrictions, an element defined by the phrase "including a . . . " does not exclude the presence of another same element in a product or system that includes the element.

It should be understood that the term "and/or" in the text merely describes associations between associated objects, and it indicates three types of relationships. For example, A and/or B may indicate that A exists alone, A and B coexist, or B exists alone. In addition, the character "/" in the text generally indicates that the associated objects are in an "or" relationship.

The above explanation shows and describes several preferred embodiments of the present application. But as mentioned above, it should be understood that the present application is not limited to the form disclosed herein, and the explanation should not be regarded as an exclusion of other embodiments. Various combinations, modifications and environments can be achieved through the above guides and technologies or knowledge in related fields within the scope of conception of the present application described herein. All the modifications and combinations made by those skilled in the art without departing from the spirit and scope of the present application should also fall within the protection scope of the appended claims of the present application.

What is claimed is:

1. A repair method for self-detecting and self-healing of a corrosion defect in a structural component, the repair method comprising:
   using a Joule heating effect generated at a partial portion of the corrosion defect in a micro-arc discharge process, resulting in heating of an edge of the corrosion defect;
   cleaning a surface of the structural component having the corrosion defect according to a service condition of the structural component;
   determining a size and array of a repair probe according to a state of the corrosion defect in the structural component;
   preparing a working medium according to a heat source and an operation condition;
   repairing the surface of the structural component by the using of the Joule heating effect generated at the partial portion of the structural component in the micro-arc discharge process; and
   treating the surface of the structural component, and detecting a repaired position to determine a repair effect,
   wherein a melted metal flows into the corrosion defect under an effect of a thermal stress such that the self-detecting and self-healing repair for the corrosion defect is achieved, and
   wherein the working medium comprises a solution or a gas; and wherein, when a solution serves the working medium, the solution is conductive and is selected to avoid secondary damage to the structural component.

2. The repair method according to claim 1, wherein the determining of the size and array of the repair probe comprises: when a position of the corrosion defect is detected, selecting a size and array of the repair probe size according to a detection range; and wherein, the size of the repair probe is selected according to a power supply matched with the repair probe to achieve a partial high-energy input, such that an energy density for partial melting of the partial portion of the corrosion defect is achieved.

3. The repair method according to claim 1, wherein an electron flow or a plasma flow generated in an electric field serves as a heat source for the heating effect in the micro-arc discharge process.

4. The repair method according to claim 1, wherein during the repairing of the surface of the structural component: currents are accumulated at a tip of the corrosion defect due to a skin effect when flowing through the surface of the structural component to be repaired, the partial portion of the corrosion defect undergoes a temperature rise corresponding with a voltage rise to a melting point of a metal, and a liquid metal flows into the corrosion defect under an effect of surface tension, such that the corrosion defect is repaired.

5. The repair method according to claim 1, wherein the corrosion defect comprises one of: pitting corrosion, intergranular corrosion, or a microcrack.

6. The repair method according to claim 1, wherein the corrosion defect has a depth of less than 300 microns, wherein an interface between a repaired area and a substrate is formed via metallurgical bonding; and after the self-detecting and self-healing repair is achieved, the repaired area has microstructure and corrosion performance similar to a structure component without the corrosion defect.

7. The repair method according to claim 1, wherein the structural component comprises steel, aluminum, or copper.

8. The repair method according to claim 1, wherein the structural component comprises a steel alloy, aluminum alloy, or copper alloy.

9. The repair method according to claim 1, wherein the corrosion defect is a dish-shaped corrosion defect.

10. The repair method according to claim 1, wherein the partial portion of the corrosion defect is a tip of an edge of the corrosion defect.

* * * * *